United States Patent [19]

Blum

[11] 4,273,416

[45] Jun. 16, 1981

[54] INDICATING TEST TUBE RACK

[76] Inventor: Alvin S. Blum, 2350 Del Mar Pl., Fort Lauderdale, Fla. 33301

[21] Appl. No.: 177

[22] Filed: Jan. 2, 1979

[51] Int. Cl.³ .......................... B01L 9/06; G02B 7/02

[52] U.S. Cl. .......................... 350/239; 211/73; 211/74; 350/243; 356/244

[58] Field of Search .................... D24/32; 211/71, 72, 211/73, 74; 356/244, 246; 422/102, 104; 350/239, 243, 244

[56] References Cited

U.S. PATENT DOCUMENTS

| | | | |
|---|---|---|---|
| 1,188,146 | 6/1916 | Bogley | 211/74 |
| 1,836,138 | 12/1931 | Turner et al. | 211/74 |
| 2,902,170 | 9/1959 | Miller | D24/32 X |
| 2,917,183 | 12/1959 | Seelye | 211/74 |
| 2,979,210 | 4/1961 | Patterson | 211/74 |
| 3,142,385 | 7/1964 | Kahlenberg | 211/74 |
| 3,199,684 | 8/1965 | Bradley | 211/74 |
| 3,604,566 | 9/1971 | Rem et al. | 211/74 |
| 3,923,160 | 12/1975 | Hirano et al. | 211/73 |
| 3,948,606 | 4/1976 | Johnson | 442/104 |
| 4,124,122 | 11/1978 | Emmitt | 442/104 X |

FOREIGN PATENT DOCUMENTS

| | | | |
|---|---|---|---|
| 375116 | 5/1923 | Fed. Rep. of Germany | 350/243 |

*Primary Examiner*—F. L. Evans

[57] ABSTRACT

There is herein disclosed a rack for test tubes and the like comprising means for maintaining said tubes in one of two alternating stable operating positions to record operations performed. A third optional grasping position holds tubes for such purposes as shipping, inverting or water bath incubation.

16 Claims, 8 Drawing Figures

INDICATING TEST TUBE RACK

BACKGROUND OF THE INVENTION

1. Field of the Invention

This invention relates to racks for storing or holding test tubes and the like, and more particularly to a rack constructed and arranged to hold test tubes or similar vessels in one of two alternating stable operating positions to easily record and indicate to the operator when an operation has been performed upon a particular vessel in a row of such vessels. The invention further relates to test tube racks having optional tube grasping means to hold tubes firmly allowing said rack to serve as a shipping container. The grasping means may also be used to hold said tubes while inverted for draining or incubating in a water bath.

2. Description of the Prior Art

The most pertinent prior art known to the applicant are the U.S. Pat. Nos. Bogley 1,188,146; Hirano 3,923,160; Rem 3,604,566. When an operator is processing a large number of specimens in test tubes in racks of the prior art, no means are provided by the rack or holder to remind him of which tube has been processed last, so that he must rely upon his memory or change in the appearance of the specimen as the result of the last processing step. When the operator is interrupted or distracted during a processing step, he may return to the wrong tube and thereby miss a step or repeat a step on one or more specimens. Some procedures require that each test tube be inverted and the contents drained. Because racks of the prior art make no provision for this procedure, each tube must be individually removed from the rack and drained. Many test tubes are now of light weight material and may contain only small volumes of liquid. When a rack of such tubes is placed in a water bath, the tubes may float out, disrupting the procedure. Racks of the prior art make no provision for preventing this. When a large number of special reagent test tubes such as antibody coated tubes are used they must be removed from their shipping or storage containers and one at a time placed in a test tube rack prior to use.

SUMMARY OF THE PRESENT INVENTION

This invention relates, generally, to a new and improved device for holding test tubes and the like, and improving the procedures carried out upon them and their contents. It is, accordingly, an object of the present invention to provide an improved rack or holder for test tubes and the like which will reduce the likelihood of human error by means recording and indicating previous operations perfomed on said tubes. It is an object of the present invention to provide a test tube rack having means for two alternating generally stable positions for said tubes in said rack, said positions being readily alternated by the operator in the course of his activities. It is another object to provide optional grasping means in yet another position to hold said test tube more firmly within said rack while inverting to drain its contents, or to prevent tubes floating when placed in a liquid bath. Another object is to provide a simple and inexpensive test tube support which will serve as both a tube grasping shipping holder and a laboratory test tube rack ready for use with test tubes already loaded. These and other objects can be attained by a test tube rack constructed so as to allow said tubes to move or oscillate each in a plane generally parallel to the planes of motion of all other tubes and said planes generally perpendicular to the long axis of the rack. The tubes pivot about the bottom of the tube or a point part way up the tube. Their motion in other planes is restricted. Limit means allow the tubes to describe a to and fro motion with the mass of the tube and contents pressing the tube against the first limit to provide a generally stable position. Movement to the other stable position against the second limit is easily provided by touching the pipet tip to the opposite inside wall of the test tube after dispensing pipet contents. This provides a record and indication to the operator that he has dispensed into that test tube since its position is now different than the next tube in sequence. Since this procedure encourages more consistent pipetting practice, it should promote more reproducible dispensing. These and other objects, and the novel details of construction of numerous commercially practical embodiments of the invention will become more apparent as this description proceeds, especially when considered in connection with the accompanying drawings.

DESCRIPTION OF THE PREFERRED EMBODIMENTS

Figure 1:
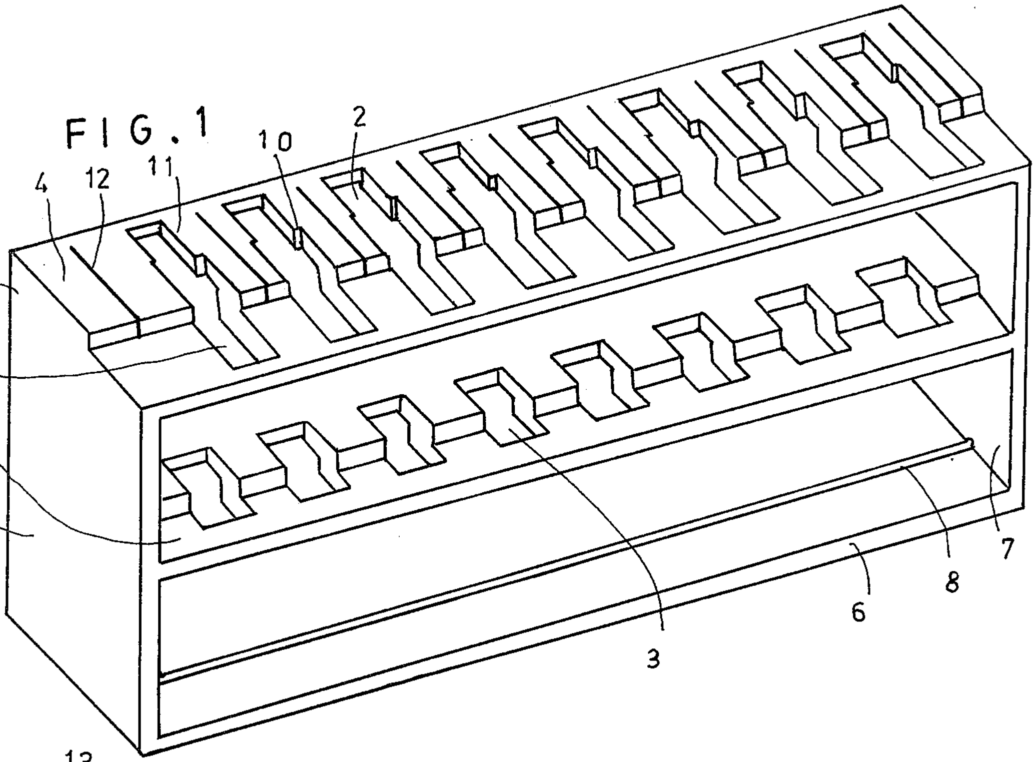
FIG. 1 is a perspective view of the test tube rack constructed in accordance with a perferred embodiment of the present invention.
Figure 2:
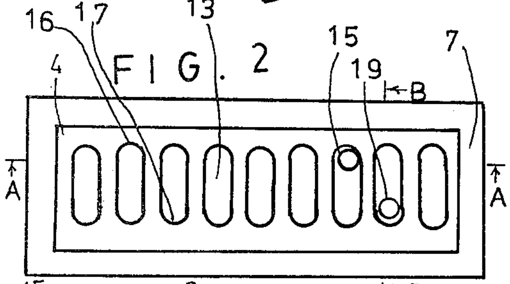
FIG. 2 is another embodiment of the present invention.
Figure 2A:
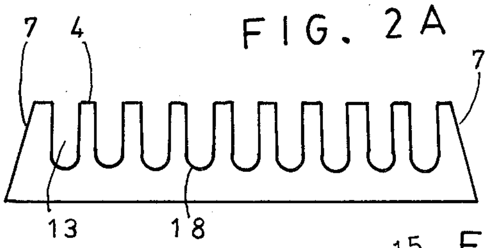
FIG. 2A is a sectional view through A—A of FIG. 2.
Figure 2B:
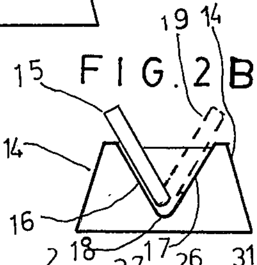
FIG. 2B is a sectional view through B—B of FIG. 2.

Referring now in detail to the drawings, FIG. 1 shows a test tube holder 1 of this invention molded in a single piece. All through holes are of an over and under constructon allowing molding with a simple two piece mold. It includes three horizontal members, upper 4, intermediate 5 and base 6 joined to two vertical support members 7. A plurality of apertures 2 in upper member 4 and apertures 3 in intermediate member 5 provide holding means for a plurality of test tubes or other containers which are arranged vertically separated from one another, each of said tubes resting upon base 6 and passing through one aperture 3 and one aperture 2, while the top of said tube projects above upper member 4. The length and width of aperture 3 and the width of aperture 2 are slightly larger than said tube diameter. The length of aperture 2 is much greater than tube diameter. The tube is thereby free to pivot about aperture 3, the upper portion of the tube moving to and fro in elongate aperture 2. The to and fro movement of the bottom of the tube is slightly impeded by ridge 8 in base 6, beneath aperture 3. Ridge 8 and the weight of tube and its contents causes the tube to assume either one of two sloping positions at an angle to the vertical, resting against stop 9 at the front of aperture 2 or against stop 10 at back of aperture 2. Beyond stop 10 at back of elongate aperture 2 is a narrower grasping region 11 of the aperture. This region is slightly narrower than the diameter of the tube. If the tube is of an elastic material, it may be squeezed into this region where it will be grasped by the side walls. Slots 12 beside regions 11 allow springable flexing of side walls to provide grasping means for rigid tubes. Three positions for test tubes are thereby provided. A forward sloping position against stop 9, and a rearward sloping position against stop 10. A touch of the dispensing pipet can serve to move the tube from one of these two positions to the other to indicate to the operator that the tube has been processed in that step. The third or grasping position is attained by pressing the tube into the constricted region. Grasping means may alternatively be provided by constricting projections from the long walls of the aperture 2. FIG. 2 shows a test tube rack of this invention formed from a single sheet of transparent material. Although means for only a single row of tubes is shown, a plurality of rows may be provided in the same manner. Tubes are held in depressions 13 in upper surface 4 supported by side walls 7 and end walls 14. FIG. 2A shows cross section through line A—A of FIG. 2 and FIG. 2B shows cross section through line B—B of FIG. 2. Depression 13 is a generally conic slot having sloping front and rear faces and generally vertical sides, so that a test tube 15 pivots at its base in the bottom 18 of the depression and rests against rear sloping face 16 of the depression in a first stable position. In the second stable position indicated by dotted lines, the tube 19 rests against front sloping face 17 of the depression. Holes, not indicated, may be provided for drainage. Grasping means are not shown. One of the two positions may be made a grasping position by narrowing one end of the top of the depression. Alternatively, a third, grasping position may be provided by further elongation of the depression with molded in grasping projections. This surface configuration may also be molded into a foam or solid block.

Figure 3:
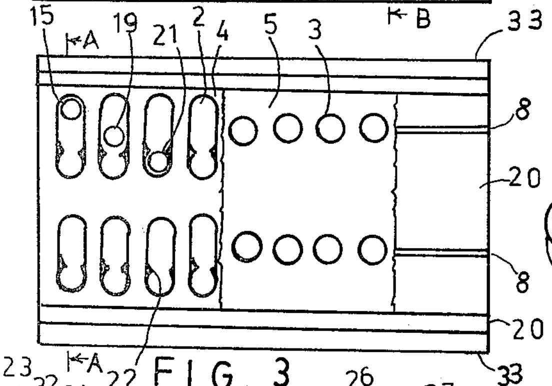
FIG. 3 is another embodiment of the present invention assembled from several components.
Figure 3A:
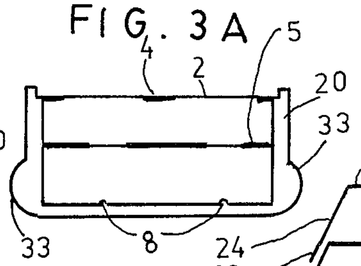
FIG. 3A is a sectional view through A—A of FIG. 3.

FIG. 3 shows a test tube holder of this invention comprising: an extruded supporting channel 20, having ridges 8 in its base and magnifying means 33 in its side; upper member 4 having two rows of apertures 2 therein; and intermediate member 5 having 2 rows of holes 3 therein. FIG. 3A is a cross section on line A—A of FIG. 3. A test tube pivots about hole 3 in intermediate member 5 and moves to and fro in elongate hole 2 from a first stable position 15 to a second stable position 19, passing over ridge 8 in base. A third, grasping position 21 is provided by inner projections 22 which act as grasping means and also as stop means for position 19. Magnifying means 33 molded into transparent channel 20 provides improved optical examination of tube contents.

Figure 4A:
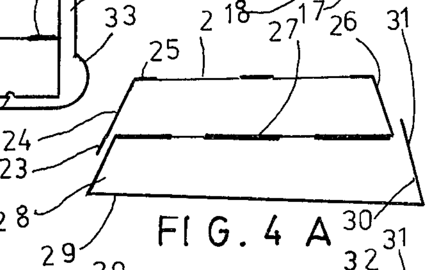
FIG. 4A is a side view of the folded sheet of FIG. 4.
Figure 4:
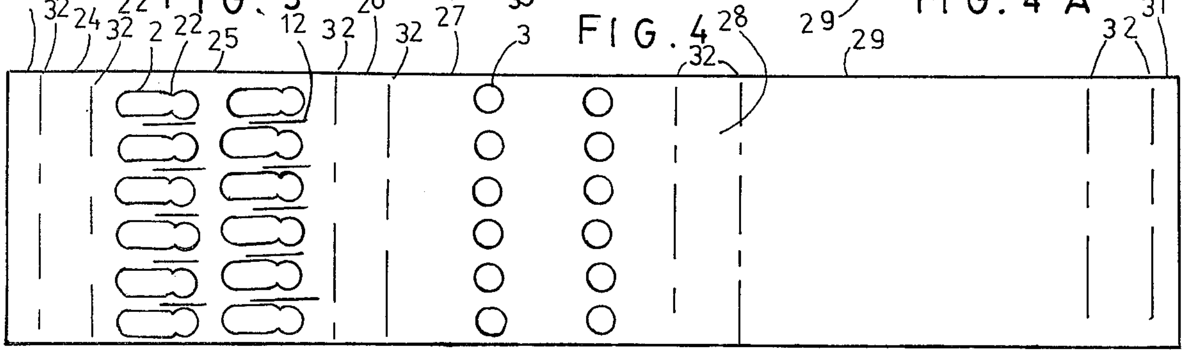
FIG. 4 is another embodiment of the present invention formed by folding and fastening a perforated sheet material.

FIG. 4 is a plan view showing a sheet like material from which a test tube support according to this invention is formed. FIG. 4A is a side view of the test tube support formed from the sheet like material of FIG. 4 by folding and fastening. Folding lines 32 divide the rectangular sheet into sections. Section 25 forms the upper member. It is provided with a plurality of apertures 2. Section 27 forms the intermediate member. It is provided with holes 3 slightly larger than the tube diameter. Section 29 forms the base. It is larger than section 27 which is large than section 25, thereby forming a portion of a triangle which is stable and more rigid than a rectangle. Sections 24 and 26 form upper sides and sections 28 and 30 form lower sides. Flaps 23 and 31 overlap sections 28 and 26 respectively and are fastened thereto by fastening means. Elongate holes 2 in upper section 25 have inner projections 22 to provide grasping means. Slots 12 provide more flexiblity to grasping means. The above illustrate various embodiments for racks providing motion to test tubes limited to one plane with two alternating stable positions and an optional grasping position. In all of these embodiments, position controlling means are above pivoting means. In other embodiments position controlling means may be below pivoting means. The particular usages discussed and the various embodiments are illustrative only and they are not intended to limit the use to which any of the aforementioned described units may be put. The foregoing detailed description has been given for clearness of understanding only, and no unnecessary limitations should be understood therefrom, as some modifications may be obvious to those skilled in the art.

I claim:

1. A rack for test tubes and the like comprising: means for holding each of said tubes in two generally stable, easily observable positions, wherein each of said tubes individually may be readily changed from one of said positions to the other of said positions, wherein holding means for each said tube comprises individual opening means in said rack, said opening means being generally of a size and shape to cause said tube to pivot about a portion of said tube, while another portion of said tube moves to and fro in a limited channel from one generally stable position to a second generally stable position, wherein a portion of each of said opening means is elongate and said elongate portions are parallel, restricting said tubes to a to and fro motion at this region of said tubes and another portion of each of said opening means restricts said tubes to a pivoting motion at this other region of said tubes.

2. The invention of claim 1, which further comprises means for holding said test tubes in yet another position by grasping means, said grasping means grasping said tube so that it will not readily move out of said grasp without deliberate effort.

3. The invention of claim 1, wherein holding means for said test tube comprises individual opening means for each of said tubes, said opening means being generally of a size and shape to cause said tube to pivot about a lower portion of said tube, while upper portion of said tube moves to and fro in a limited channel from one sloped-from-the-vertical position to a second sloped-from-the-vertical position.

4. The invention of claim 2 wherein holding means for said test tube comprises individual opening means for each of said tubes, said opening means being generally of a size and shape to cause said tube to pivot about a lower portion of said tube, while upper portion of said tube moves to and fro in a limited channel from one sloped-from-the-vertical position to a second sloped-from-the-vertical position.

5. The invention of claim 2 wherein said grasping means comprises a constriction of a portion of side walls of one end of said opening means to springably grasp the walls of said tube.

6. The invention of claim 1 formed from a folded sheet of material, said rack comprising: a top; a bottom; a front wall; a rear wall; and an intermediate section interposed between said top and said bottom, said top having a plurality of parallel elongate openings restricting said tubes to a to and fro motion, and said intermediate section having a plurality of openings restricting said tubes to a pivoting motion at this region.

7. The rack of claim 2 formed from a folded sheet of material, said rack comprising: a top; a bottom; a front wall; a rear wall; and an intermediate section interposed between said top and bottom, said top having a plurality of parallel elongate openings restricting said tubes to a to and fro motion, and said intermediate section having a plurality of openings restricting said tubes to a pivoting motion at this region.

8. The rack of claim 3 wherein said openings are molded into the upper surface of a sheet or block of material.

9. The rack of claim 4 wherein said openings are molded into the upper surface of a sheet or block of material.

10. The rack of claim 1 wherein one of said two positions is a grasping position providing grasping means, said grasping means grasping said tube so that it will not readily move out of said grasp without deliberate effort.

11. The invention of claim 1 formed from a plurality of perforated members held in channel means.

12. The invention of claim 2 formed from a plurality of perforated members held in channel means.

13. The invention of claim 1, which further comprises: at least one vertical wall of transparent material provided with magnifying means for observing the contents of said test tubes.

14. The invention of claim 2, which further comprises: at least one vertical wall of transparent material provided with magnifying means for observing the contents of said test tubes.

15. The invention of claim 1, including a bottom member having ridge means to limit motion of said tubes.

16. The invention of claim 2 including a bottom member having ridge means to limit motion of said tubes.

* * * * *